H. KUNZE.
LEASH.
APPLICATION FILED APR. 23, 1915.

1,161,870.  Patented Nov. 30, 1915.

Witnesses
W. S. McDowell
H. A. Hester

Inventor
Herman Kunze

By Victor J. Evans
Attorney

UNITED STATES PATENT OFFICE.

HERMANN KUNZE, OF PHILADELPHIA, PENNSYLVANIA.

LEASH.

1,161,870.     Specification of Letters Patent.     Patented Nov. 30, 1915.

Application filed April 23, 1915. Serial No. 23,531.

*To all whom it may concern:*

Be it known that I, HERMANN KUNZE, a subject of the Emperor of Germany, residing at Philadelphia, in the county of Philadelphia and State of Pennsylvania, have invented new and useful Improvements in Leashes, of which the following is a specification.

An object of the invention is to provide a leash for securing animals, particularly hounds, and which permits of readily releasing the animal from leash.

The invention contemplates, among other features, the provision of a leash that is particularly adapted for use in securing what are commonly known as police dogs, and to this end the device consists of a suitable handled thong or strap, with means for connection with the collar on the neck of the dog or hound whereby the animal will be held from escaping or running away, further means being provided for releasing the connection between the strap and the collar so as to release the animal from leash.

In the further disclosure of the invention reference is to be had to the accompanying drawings, constituting a part of this specification, in which similar characters of reference denote corresponding parts in all the views, and in which—

Figure 1:
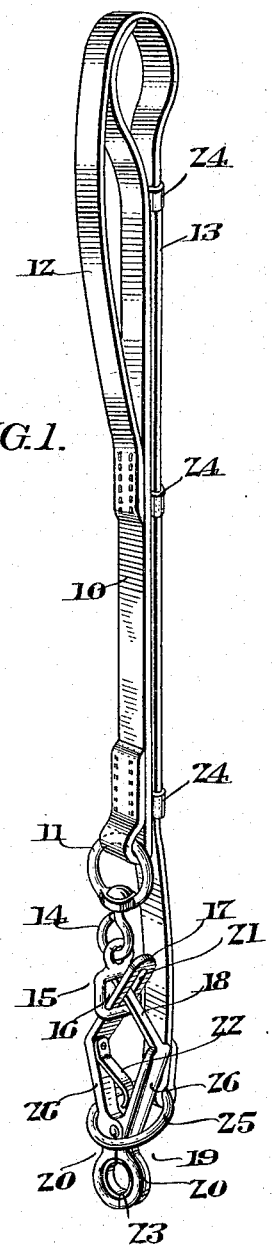
Figure 2:
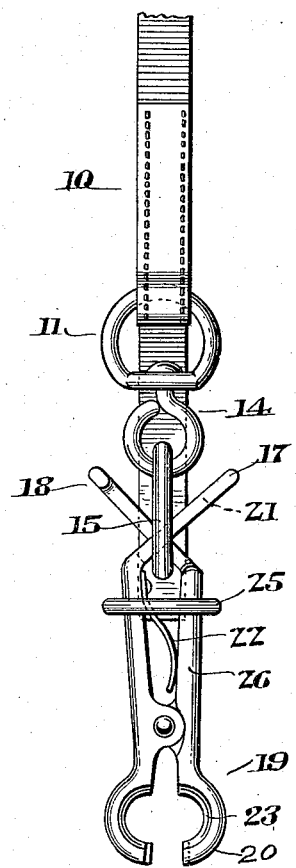

Figure 1 is a perspective view of the leash, the snap hook being shown closed; and Fig. 2 is a fragmentary enlarged elevation showing the snap hook open.

Referring more particularly to the views, I provide a main strap 10 which, at its lower end, is looped around a ring 11, said main strap 10 having its upper end secured to the inner end of a handle 12 formed by a supplementary strap 13, with the free end of the handle 12 secured to the main strap 10 between its ends. A swiveled eye 14 depends from the ring 11 and carries a depending preferably rectangular member 15 having an opening 16 through which passes the inner ends 17, 18 of a snap hook 19. The snap hook 19 consists, more particularly, of pivotally connected portions 20, the inner end 17 of one of the portions being provided with a longitudinal slot 21 through which is arranged to pass and in which is adapted to slide the inner reduced end 18 of the other portion 20, a suitable spring 22 being secured to the first mentioned portion and bearing against the second mentioned portion whereby to hold the forward or lower ends of the snap hook relatively closed, said ends when closed forming an eye 23.

A series of guide loops 24 are suitably arranged upon the main strap 10 and the supplementary strap 13 passes loosely through the loops, with the lower end of the supplementary strap carrying a hook actuating member 25 in the nature of a ring and which encircles the snap hook 19 as shown. The shanks of the snap hook, said shanks forming parts of the portions 20 and indicated by the numeral 26, relatively diverge from the point of pivotal connection of the portions 20 and the ends 17, 18 converge to pass through the opening 16 in the member 15.

Now it will be clearly seen that when the hand grasps the handle 12 and the eye 23 is suitably connected with the collar on the neck of a hound or other animal (not shown), the snap hook will form an effective connection between the strap and collar, and regardless of the pull of the animal upon the main strap the snap hook will remain in its locked relation to the collar. When it is desired to suddenly release the animal from leash, the hand is removed from the handle 12 and arranged to grasp the upper end of the supplementary strap 13, thus in view of the pull exerted by the animal causing the actuating member 25 to slide upwardly on the snap hook and bear against the faces of the shanks 26, thereby removing the shanks toward each other and against the action of the spring 22 and resulting in the opening of the eye 23, thus disengaging the same from the collar on the neck of the animal. The position of the actuating member 25 when the snap hook is opened is clearly shown in Fig. 2, and from the foregoing description it will be clear that the animal can be released from leash without necessitating any manual operation on the part of the operator other than the changing of the grip of the hand from the handle 12 to the supplementary strap 13.

Having thus described my invention, I claim:—

In a leash, a main strap, a supplementary strap arranged to slide relatively to said main strap, a snap hook carried by the lower end of the main strap and including a pair of normally closed pivoted jaws, relatively divergent shanks forming part of said jaws, and a ring carried by the lower end of said slidable strap and encircling said shanks, said ring being operable against said shanks to open said jaws.

In testimony whereof I affix my signature in presence of two witnesses.

HERMANN KUNZE.

Witnesses:
JOHN A. KEMMLER,
W. S. McDOWELL.